US012641649B2

(12) United States Patent
Akl et al.

(10) Patent No.: US 12,641,649 B2
(45) Date of Patent: May 26, 2026

(54) RANDOM ACCESS CHANNEL COLLISION DURING TIMING ADJUSTMENT ACQUISITION FOR LAYER 1 OR LAYER 2 TRIGGERED MOBILITY

(71) Applicant: QUALCOMM Incorporated, San Diego, CA (US)

(72) Inventors: Naeem Akl, Bridgewater, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 18/297,446

(22) Filed: Apr. 7, 2023

(65) Prior Publication Data

US 2024/0340961 A1     Oct. 10, 2024

(51) Int. Cl.
| | |
|---|---|
| *H04W 4/00* | (2018.01) |
| *H04W 36/08* | (2009.01) |
| *H04W 74/0833* | (2024.01) |

(52) U.S. Cl.
CPC ....... *H04W 74/0833* (2013.01); *H04W 36/08* (2013.01)

(58) Field of Classification Search
CPC ............. H04W 74/0833; H04W 36/08; H04W 36/0055; H04W 74/002
See application file for complete search history.

(56) References Cited

U.S. PATENT DOCUMENTS

| | | | | |
|---|---|---|---|---|
| 2013/0064165 | A1* | 3/2013 | Chen ................ | H04W 56/0045 |
| | | | | 370/312 |
| 2018/0324867 | A1* | 11/2018 | Basu Mallick ....... | H04W 72/21 |
| 2020/0350972 | A1* | 11/2020 | Yi .......................... | H04B 7/088 |
| 2022/0191940 | A1* | 6/2022 | MolavianJazi ... | H04W 74/0833 |
| 2022/0210844 | A1* | 6/2022 | MolavianJazi ....... | H04L 5/0053 |

(Continued)

FOREIGN PATENT DOCUMENTS

| | | | | | |
|---|---|---|---|---|---|
| WO | WO-2023038438 A1 * | 3/2003 | ........ | H04W 74/0833 |
| WO | WO-2013025009 A2 * | 2/2013 | ........ | H04W 74/0833 |

(Continued)

OTHER PUBLICATIONS

Interdigital Communications: "Random Access Procedure in NR", 3GPP TSG-RAN WG2 Meeting #97bis, R2-1702869(R15 NR WI AI10314 Rach Procedure), 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017, Apr. 3, 2017, pp. 1-2, XP051244849, paragraph [0002].

(Continued)

*Primary Examiner* — Thai Dinh Hoang
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may initiate a first random access channel (RACH) procedure with a serving cell of the UE. The UE may receive, prior to terminating the first RACH procedure, a trigger for a second RACH procedure with a candidate cell of the UE. The UE may initiate the second RACH procedure with the candidate cell. Numerous other aspects are described.

26 Claims, 12 Drawing Sheets

(56) References Cited

U.S. PATENT DOCUMENTS

2022/0256612 A1*  8/2022  MolavianJazi  ....... H04L 5/0048
2023/0072939 A1*  3/2023  Eda  ....................... H04W 72/23
2023/0370910 A1*  11/2023  Sabouri-Sichani  ..........................
                                          H04W 36/00835

FOREIGN PATENT DOCUMENTS

WO      WO-2016024900 A1 *  2/2016   ............... H04L 5/22
WO      WO-2020013741 A1 *  1/2020   ........ H04W 74/0833
WO      WO-2021239895 A1    12/2021
WO      WO-2023001529 A1 *  1/2023   ........ H04W 74/0833

OTHER PUBLICATIONS

Interdigital Inc: "LTM Characteristics and Scenarios", 3GPP TSG
RAN WG2 #120, R2-2212291, Type Discussion, NR MOB ENH2-
CORE, 3rd Generation Partnership Project (3GPP), Mobile Com-
petence Centre, 650, Route Des Lucioles, F-06921 Sophia-Antipolis
Cedex, France, vol. 3GPP RAN 2, No. Toulouse, FR, Nov. 14,
2022-Nov. 18, 2022, Nov. 3, 2022, 6 Pages, XP052216375, para-
graph [0002]-paragraph [0003].
International Search Report and Written Opinion—PCT/US2024/
018762—ISA/EPO—Jun. 12, 2024.

* cited by examiner

400

| UE | | Network Node |
|---|---|---|

UE in RRC_CONNECTED

LTM preparation

402: Measurement report

LTM candidate preparation

404: RRC reconfiguration (LTM candidate configuration)

406: RRC reconfiguration complete

Early sync

408: DL/UL synchronization with candidate cells

LTM execution

410: L1 measurement report

LTM decision

412: Cell switch command (MAC-CE)

Detach from source cell

414: RACH Procedure

LTM completion

416: LTM completion

FIG. 4

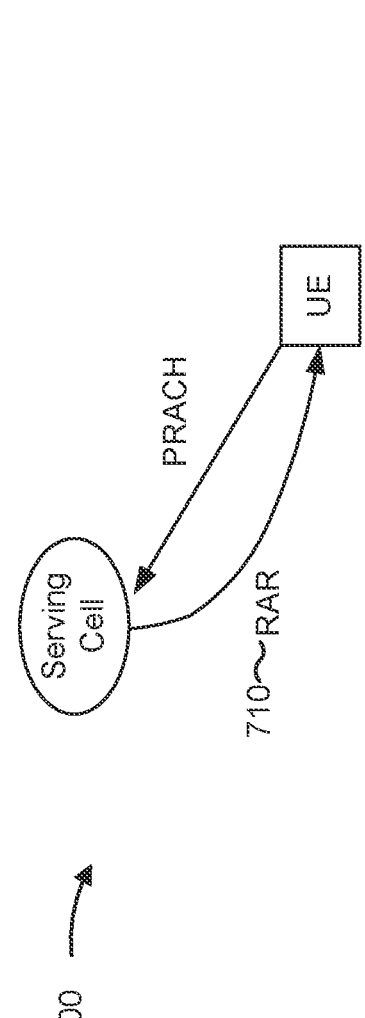
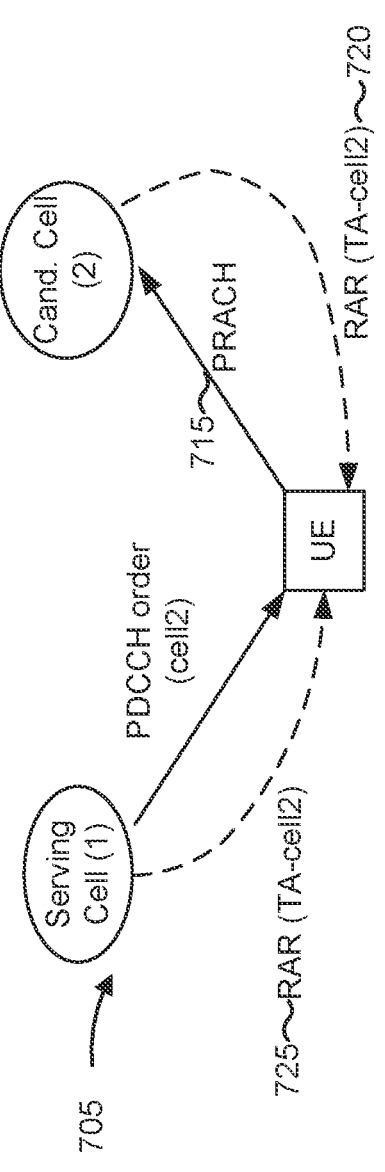
FIG. 7

910 Initiate a first random access channel (RACH) procedure with a serving cell of the UE 920 Receive, prior to terminating the first RACH procedure, a trigger for a second RACH procedure with a candidate cell of the UE 930 Initiate the second RACH procedure with the candidate cell

900

1010 — Perform at least part of a first RACH procedure with a serving cell of a user equipment (UE)

1020 — Transmit, prior to terminating the first RACH procedure, a trigger for a second RACH procedure with a candidate cell of the UE

1000

RANDOM ACCESS CHANNEL COLLISION DURING TIMING ADJUSTMENT ACQUISITION FOR LAYER 1 OR LAYER 2 TRIGGERED MOBILITY

FIELD OF THE DISCLOSURE

Aspects of the present disclosure generally relate to wireless communication and to techniques and apparatuses for random access channel collision during timing adjustment acquisition for layer 1 or layer 2 triggered mobility.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include initiating a first random access channel (RACH) procedure with a serving cell of the UE. The method may include receiving, prior to terminating the first RACH procedure, a trigger for a second RACH procedure with a candidate cell of the UE. The method may include initiating the second RACH procedure with the candidate cell.

Some aspects described herein relate to a method of wireless communication performed by a network node. The method may include performing at least part of a first RACH procedure with a serving cell of a UE. The method may include transmitting, prior to terminating the first RACH procedure, a trigger for a second RACH procedure with a candidate cell of the UE.

Some aspects described herein relate to a UE for wireless communication. The UE may include a memory and one or more processors coupled to the memory. The one or more processors may be configured to initiate a first RACH procedure with a serving cell of the UE. The one or more processors may be configured to receive, prior to terminating the first RACH procedure, a trigger for a second RACH procedure with a candidate cell of the UE. The one or more processors may be configured to initiate the second RACH procedure with the candidate cell.

Some aspects described herein relate to a network node for wireless communication. The network node may include a memory and one or more processors coupled to the memory. The one or more processors may be configured to perform at least part of a first RACH procedure with a serving cell of a UE. The one or more processors may be configured to transmit, prior to terminating the first RACH procedure, a trigger for a second RACH procedure with a candidate cell of the UE.

Some aspects described herein relate to a non-transitory computer-readable medium that stores a set of instructions for wireless communication by a UE. The set of instructions, when executed by one or more processors of the UE, may cause the UE to initiate a first RACH procedure with a serving cell of the UE. The set of instructions, when executed by one or more processors of the UE, may cause the UE to receive, prior to terminating the first RACH procedure, a trigger for a second RACH procedure with a candidate cell of the UE. The set of instructions, when executed by one or more processors of the UE, may cause the UE to initiate the second RACH procedure with the candidate cell.

Some aspects described herein relate to a non-transitory computer-readable medium that stores a set of instructions for wireless communication by a network node. The set of instructions, when executed by one or more processors of the network node, may cause the network node to perform at least part of a first RACH procedure with a serving cell of a UE. The set of instructions, when executed by one or more processors of the network node, may cause the network node to transmit, prior to terminating the first RACH procedure, a trigger for a second RACH procedure with a candidate cell of the UE.

Some aspects described herein relate to an apparatus for wireless communication. The apparatus may include means for initiating a first RACH procedure with a serving cell of the apparatus. The apparatus may include means for receiving, prior to terminating the first RACH procedure, a trigger for a second RACH procedure with a candidate cell of the apparatus. The apparatus may include means for initiating the second RACH procedure with the candidate cell.

Some aspects described herein relate to an apparatus for wireless communication. The apparatus may include means for performing at least part of a first RACH procedure with a serving cell of a UE. The apparatus may include means for transmitting, prior to terminating the first RACH procedure, a trigger for a second RACH procedure with a candidate cell of the UE.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of Layer 1 or Layer 2 triggered mobility (LTM), in accordance with the present disclosure.

FIG. 7 is a diagram illustrating an example of an intra-serving-cell random access procedure and an example of a cross-cell random access procedure, in accordance with the present disclosure.

DETAILED DESCRIPTION

Figure 1:
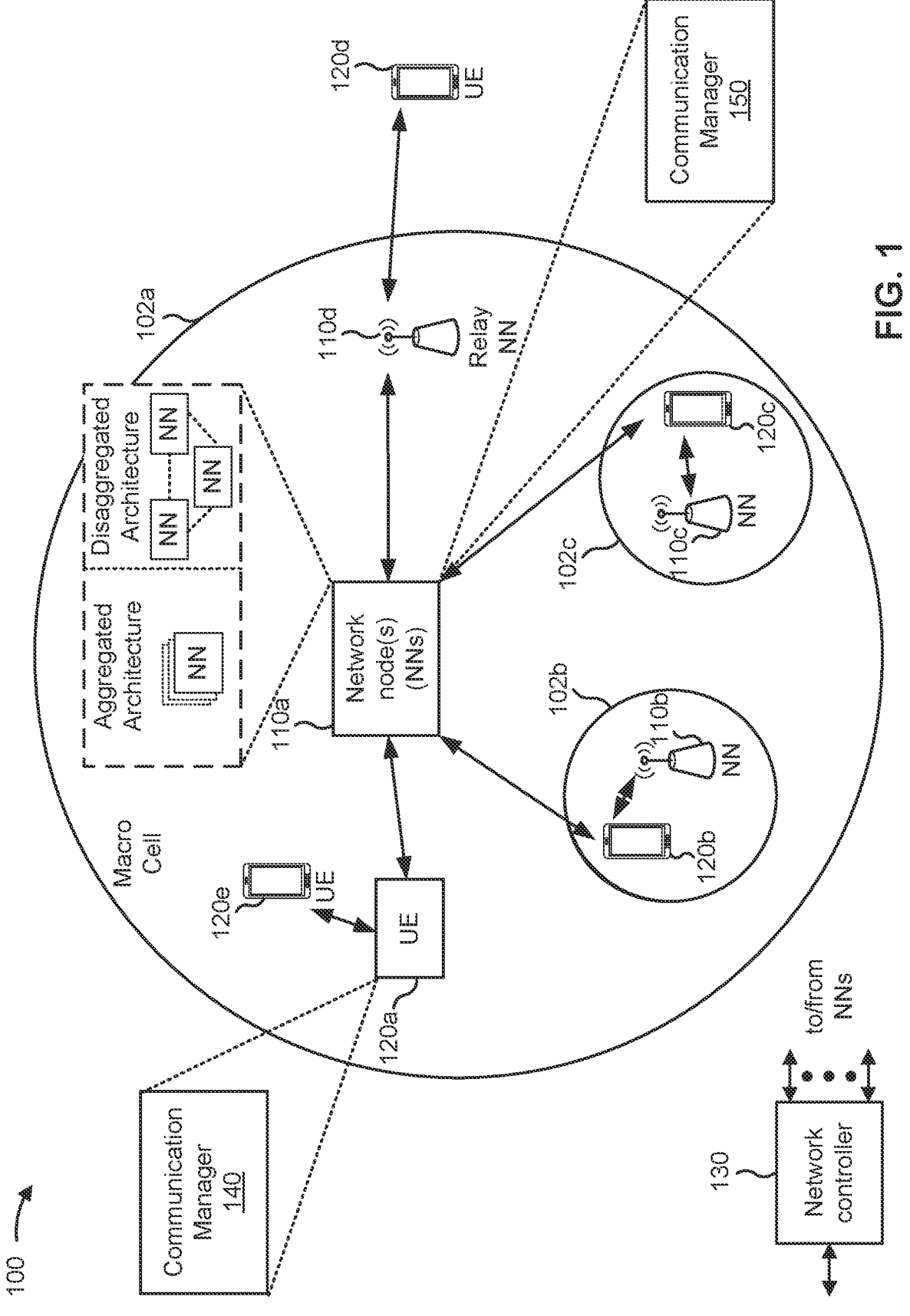
FIG. 1 is a diagram illustrating an example of a wireless network, in accordance with the present disclosure.

Layer 1 or Layer 2 triggered mobility (LTM) (which may be referred to as lower-layer triggered mobility or Layer 1 or Layer 2 triggered handover) may involve a user equipment (UE) being configured (such as via Layer 1 or Layer 2 signaling) with a set of candidate cells. The UE may be triggered, using Layer 1 or Layer 2 signaling, to add one of the candidate cells as a serving cell or a non-serving cell.

A random access channel (RACH) procedure may be initiated by a physical downlink control channel (PDCCH) order, by a UE (such as a medium access control (MAC) entity of the UE), or by radio resource control (RRC) signaling. RACH procedures are used for various purposes, such as requesting system information, beam failure recovery requests, initial access, reestablishment, RRC resume, handover, timing advance (TA) acquisition, addressing consistent uplink listen-before-talk failure, addressing scheduling request (SR) failure, small data transfer, and positioning. In particular, in the context of LTM, a RACH procedure may be used to perform "early synchronization" with a candidate cell, in which the UE synchronizes with a candidate cell to acquire a TA before (or without) receiving a cell switch command pertaining to the candidate cell. A TA may include a value indicating a time shift to be applied to communications of a UE such that the communications arrive in alignment with a reference time at a cell.

In some aspects, a RACH procedure may be triggered (such as for the purpose of early synchronization, by a serving cell) with regard to a candidate cell while another RACH procedure is ongoing with a serving cell of the UE. In some deployments, such as those that do not support LTM, there may be at most one ongoing RACH procedure in the UE's MAC entity at a given time. For example, in such deployments, one RACH procedure may be considered sufficient since the RACH procedure terminates at the same serving cell, and one RACH procedure can serve different purposes (e.g., the network acquires TA from a Msg 1 of the RACH procedure, and the UE may use a dedicated preamble of the Msg 1 to request system information). In a deployment supporting LTM, a UE may transmit a physical RACH (PRACH) transmission toward a candidate cell for early TA acquisition. However, the UE may also be expected to perform a RACH procedure with the UE's serving cell for any of the purposes described above. The candidate cell and serving cell may be different, so one RACH procedure may not be sufficient to serve different purposes. This may be problematic if a RACH procedure for a candidate cell is triggered while a RACH procedure for a serving cell (different than the candidate cell) is ongoing, since the UE may not perform or may cancel one of the two RACH procedures, thereby reducing the effectiveness of LTM or interfering with operation on the serving cell.

Various aspects described herein relate generally to wireless communication and more particularly to LTM. Some aspects more specifically relate to handling of concurrent RACH procedures. In some examples, a UE may receive or determine a trigger for a second RACH procedure with a candidate cell of the UE while a first RACH procedure with a serving cell of the UE is ongoing. For example, the UE may perform the second RACH procedure (e.g., instead of discarding the trigger). In some examples, the UE may initiate the second RACH procedure after the first RACH procedure has terminated. In some other examples, the UE may initiate the second RACH procedure before the first RACH procedure has terminated. In some aspects, the UE may differentiate whether a random access response (RAR), received from the serving cell or a candidate cell, is associated with the first RACH procedure or the second RACH procedure.

Particular aspects of the subject matter described in this disclosure can be implemented to realize one or more of the following potential advantages. In some examples, by performing the second RACH procedure after the trigger is received during the first RACH procedure, the described techniques can be used to facilitate determination of a TA for a candidate cell when both a serving cell RACH procedure and a candidate cell RACH procedure have been triggered (e.g., concurrently). By initiating the second RACH procedure after the first RACH procedure has terminated, complexity at the UE (in particular, the MAC layer) may be reduced. By initiating the second RACH procedure before the first RACH procedure has terminated, delay associated with acquiring the TA for the candidate cell is reduced. By differentiating whether an RAR is associated with the first RACH procedure or the second RACH procedure, the UE facilitates concurrent performance of multiple RACH procedures without ambiguity as to the source of an RAR.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node"

may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1. FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may initiate a first RACH procedure with a serving cell of the UE; receive, prior to terminating the first RACH procedure, a trigger for a second RACH procedure with a candidate cell of the UE; and initiate the second RACH procedure with the candidate cell. Additionally, or alternatively, the communication manager 140 may perform one or more other operations described herein.

In some aspects, the network node 110 may include a communication manager 150. As described in more detail elsewhere herein, the communication manager 150 may perform at least part of a first RACH procedure with a serving cell of a UE; and transmit, prior to terminating the first RACH procedure, a trigger for a second RACH procedure with a candidate cell of the UE. Additionally, or alternatively, the communication manager 150 may perform one or more other operations described herein.

As indicated above, FIG. 1 is provided as an example. Other examples may differ from what is described with regard to FIG. 1.

Figure 2:
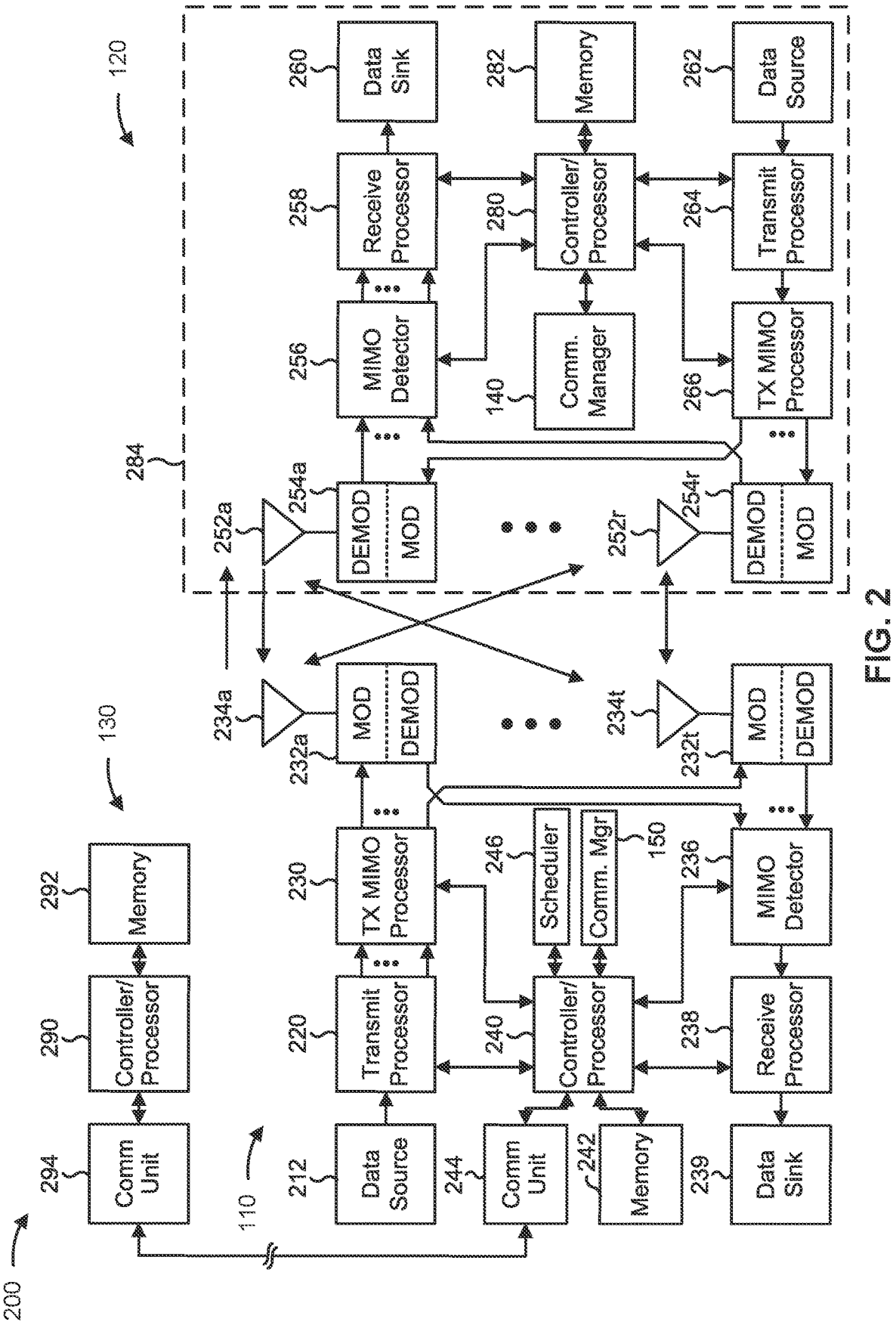
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP. RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with LTM, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for initiating (e.g., using controller/processor 280, transmit processor 264, TX MIMO processor 266, MOD 254, antenna 252, and/or the like) a first RACH procedure with a serving cell of the UE; means for receiving (e.g., using antenna 252, DEMOD 254, MIMO detector 256, receive processor 258, controller/processor 280, and/or the like), prior to terminating the first RACH procedure, a trigger for a second RACH procedure with a candidate cell of the UE; and/or means for initiating (e.g., using controller/processor 280, transmit processor 264, TX MIMO processor 266, MOD 254, antenna 252, and/or the like) the second RACH procedure with the candidate cell. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for performing (e.g., using antenna 234, modem 232, MIMO detector 236, receive processor 238, controller/processor 240, memory 242, or the like) at least part of a first RACH procedure with a serving cell of a UE; and/or means for transmitting (e.g., using controller/processor 240, transmit processor 220, TX MIMO processor 230, MOD 232, antenna 234, and/or the like), prior to terminating the first RACH procedure, a trigger for a second RACH procedure with a candidate cell of the UE. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
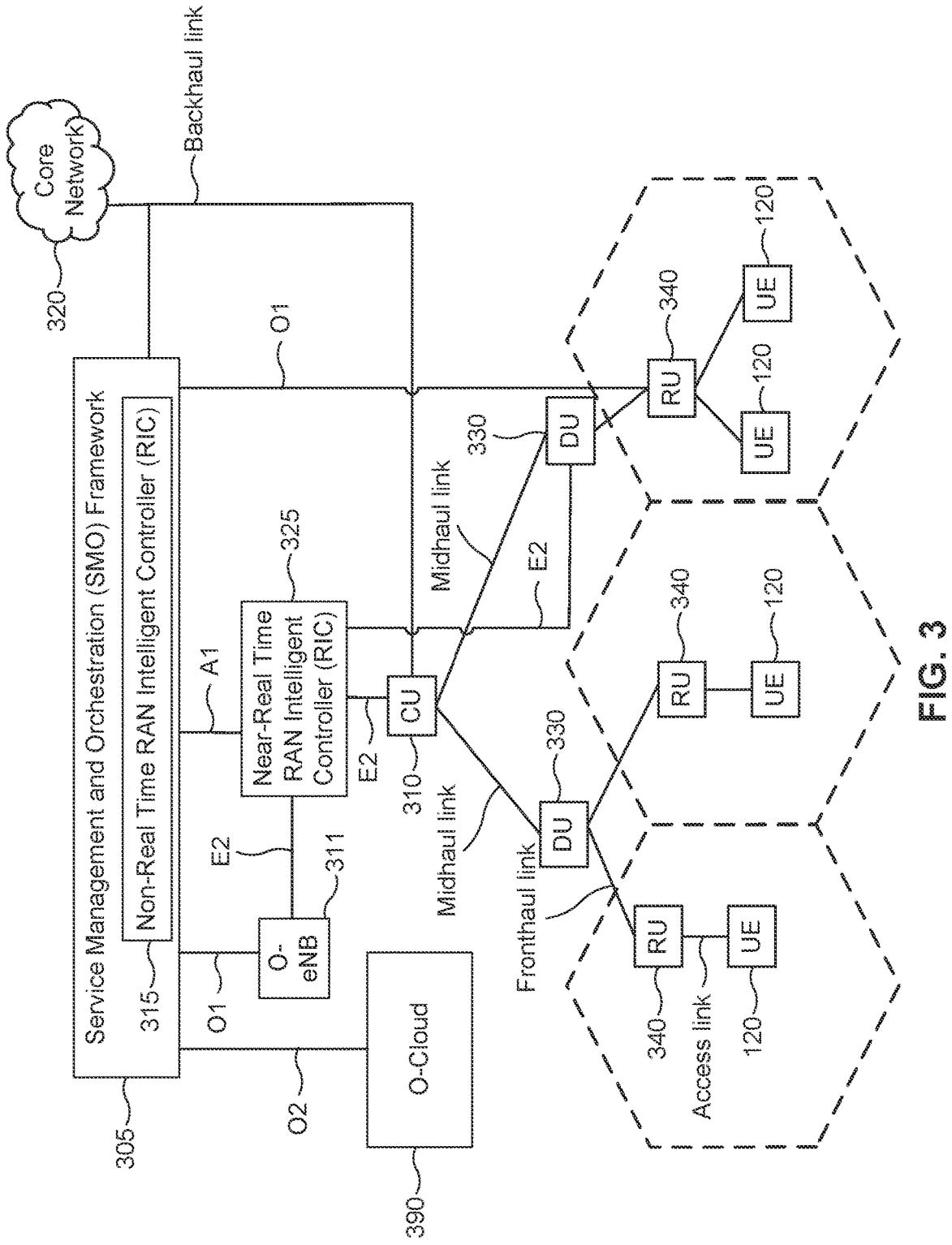
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-cNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of an LTM, in accordance with the present disclosure.

In an LTM, a UE may be in an RRC connected state. As shown in FIG. 4 by reference number 402, the UE may transmit, to a network node, a measurement report. The UE may transmit the measurement report via RRC signaling. The network node may determine, based at least in part on the measurement report, to use LTM and may initiate a candidate LTM cell preparation. As shown by reference number 404, the network node may transmit, to the UE, an RRC reconfiguration message. The RRC reconfiguration message may indicate a candidate LTM cell configuration, which may indicate a configuration of one or multiple candidate LTM target cells. The UE may store the candidate LTM cell configuration. As shown by reference number 406, the UE may transmit, to the network node, an RRC reconfiguration complete message. The measurement report, the RRC reconfiguration message, and the RRC reconfiguration complete message may be part of an LTM preparation phase.

As shown by reference 408, the UE may perform a downlink/uplink synchronization and a timing advance (TA) acquisition with candidate target cells, which may occur before receiving an LTM cell switch command. The downlink/uplink synchronization and the TA acquisition may be associated with an early synchronization phase. The UE may acquire the TA of a candidate cell by performing a RACH procedure, as described below in connection with FIG. 6. In some aspects, a serving cell of the UE may trigger the UE to acquire the TA, such as by transmitting a PDCCH order triggering the RACH procedure. A DCI (such as a DCI having format 1_0) carried by the PDCCH order may indicate the candidate cell. The RACH procedure may use contention-free random access. A preamble index and RACH occasion (as well as a synchronization signal block (SSB) association) for the candidate cell may be configured per candidate cell. The UE may receive the TA for the candidate cell via a random access response or a medium access control (MAC) message (e.g., a MAC control element (MAC-CE)). The UE may receive the TA from the candidate cell or from the serving cell.

The UE may perform L1 measurements on one or more configured candidate LTM target cells. As shown by reference number 410, the UE may transmit, to the network node, an L1 measurement report, which may indicate the L1 measurements on the one or more configured candidate LTM target cells. The network node may determine to execute an LTM cell switch to a target cell, which may be based at least in part on the L1 measurement report. As shown by reference number 412, the network node may transmit, to the UE, a MAC control element (MAC-CE) triggering the LTM cell switch, where the MAC-CE may indicate a candidate configuration index of the target cell. The UE may detach from a source cell. The UE may apply the candidate configuration index of the target cell. In other words, the UE may switch to a configuration of a candidate LTM target cell. The UE may detach from the source cell and attach to the target cell as part of an LTM execution phase.

As shown by reference number 414, the UE may perform a random access channel (RACH) procedure with the target cell (e.g., when a TA is not available). As shown by reference number 416, the UE may transmit, to the target cell, an indication of a successful completion of the LTM cell switch to the target cell. The indication of the successful completion of the LTM cell switch may be part of an LTM completion phase.

As indicated above, FIG. 4 is provided as an example. Other examples may differ from what is described with regard to FIG. 4.

An L1/L2 based inter-cell mobility may be defined for mobility latency reduction. Multiple candidate cells may be configured and maintained to allow a relatively fast application of configurations for candidate cells. A dynamic switch among candidate serving cells may be based at least in part on an L1/L2 signaling. The L1/L2 signaling may be associated with serving cell changes (or non-serving cell changes) for LTM. In other words, changing from one serving cell to another serving cell may be based at least in part on the L1/L2 signaling. The candidate serving cells may include a special cell (SpCell) and/or a secondary cell (SCell). Further, L1 enhancements may be defined for inter-cell beam management, which may include an L1 measurement and reporting, and a beam indication.

A cell update in LTM may be based at least in part on an individual cell selection. The individual cell selection may involve separate signaling for a primary cell (PCell) change and an SCell change in a carrier aggregation scenario, respectively. A PCell selection may be based at least in part on a beam indication. An SCell selection may be based at least in part on an L1/L2 signaling, which may include a downlink control information (DCI) or a medium access control control element (MAC-CE). A single PCell without a carrier aggregation or a dual connectivity may be selected among a preconfigured candidate PCell set. A PCell change may be based at least in part on a PCell and SCell swap among the preconfigured candidate PCell set. The cell update in LTM may be based at least in part on a cell group based selection. An SpCell and an SCell may be switched together in a carrier aggregation scenario. A cell group switch signaling may be based at least in part on an extension of signaling for the individual cell selection.

Figure 5:
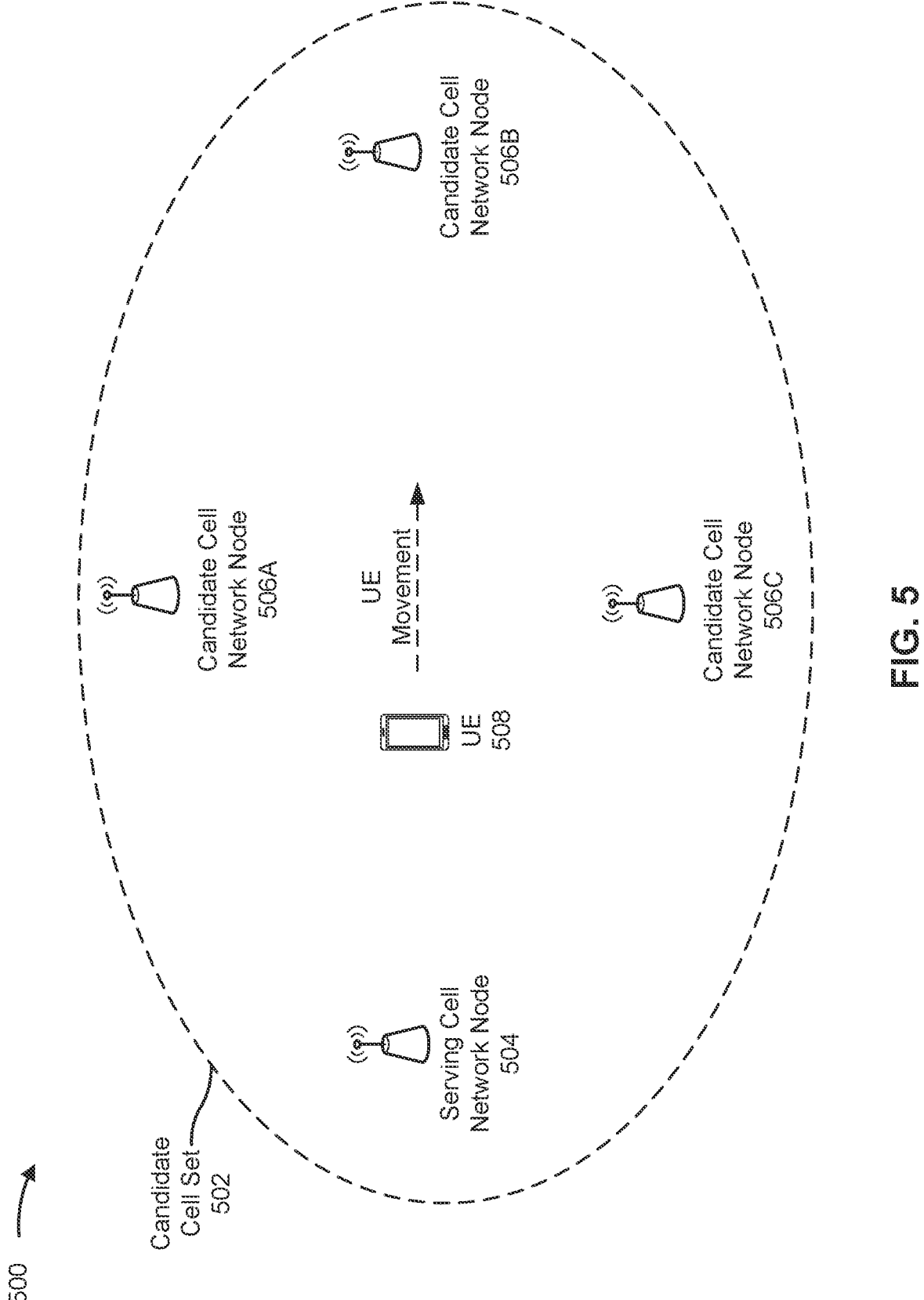
FIG. 5 is a diagram illustrating an example of UE mobility, in accordance with the present disclosure.

FIG. 5 is a diagram illustrating an example 500 of UE mobility, in accordance with the present disclosure. As shown in FIG. 5, a network may include a candidate cell set 502 that includes cells provided by a serving cell (e.g., network node) 504 (e.g., a serving cell) and a set of candidate cells provided by a set of candidate cells (e.g., network nodes) 506A, 506B, and 506C.

A UE 508 is located within coverage of the candidate cell set 502 and is in communication with the serving cell (e.g., network node) 504. While in communication with the serving cell (e.g., network node) 504. UE movement away from the serving cell (e.g., network node) 504 may cause the UE 508 to have reduced signal strength and/or capacity via the serving cell and may cause the UE 508 to have increased signal strength and/or capacity via a candidate cell, such as a candidate cell associated with the candidate cell (e.g., network node) 506B.

In some networks, a special cell (SpCell) for the UE may be updated via L1/L2 signaling based at least in part on L1 measurement of the serving cell and the candidate cell. In some networks, UE mobility (e.g., moving from one cell to another cell) may include intra-frequency and inter-frequency mobility.

As indicated above, FIG. 5 is provided as an example. Other examples may differ from what is described with respect to FIG. 5.

Figure 6:
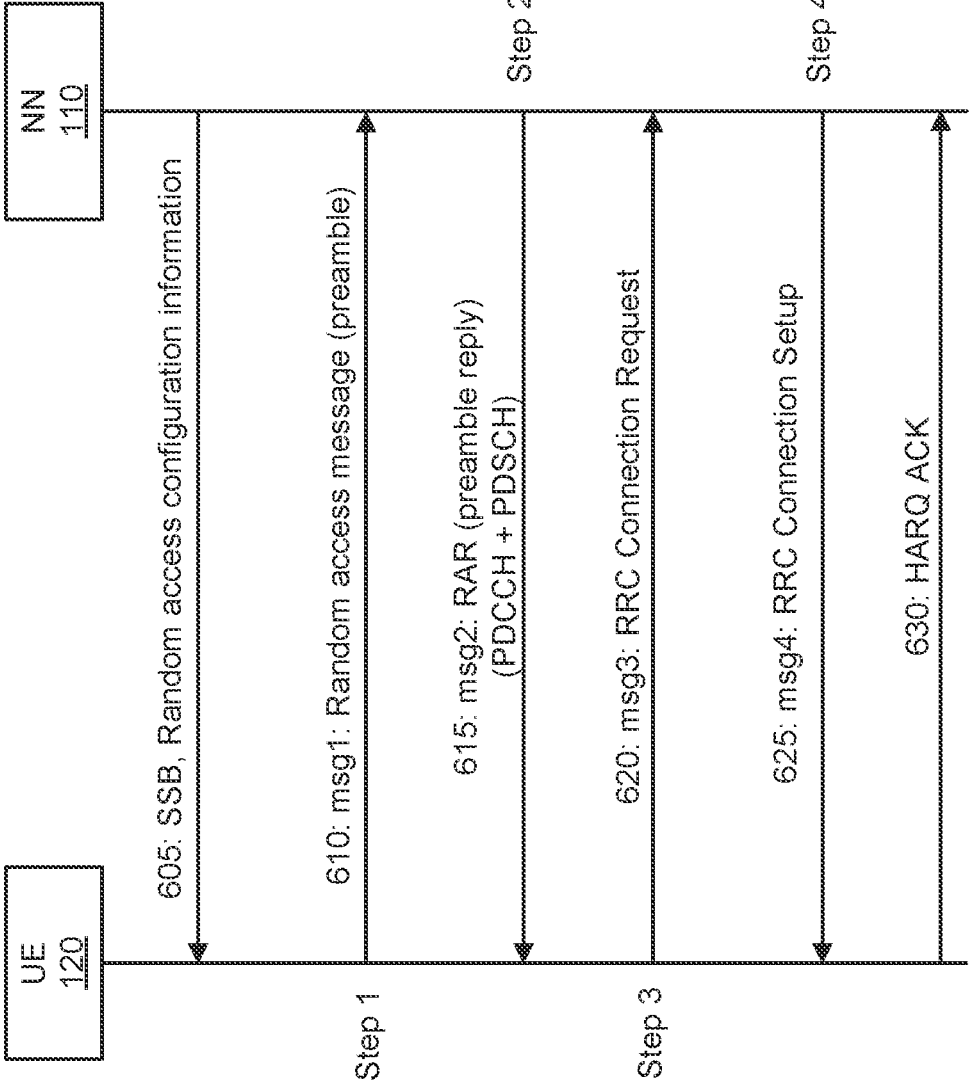
FIG. 6 is a diagram illustrating an example of a four-step random access procedure, in accordance with the present disclosure.

FIG. 6 is a diagram illustrating an example 600 of a four-step random access procedure (referred to herein as a RACH procedure), in accordance with the present disclosure. As shown in FIG. 6, a network node 110 and a UE 120 may communicate with one another to perform the four-step random access procedure. Random access may be used for different purposes, such as system information request, beam failure recovery request, initial access, re-establishment, RRC resume, handover, TA acquisition, addressing listen-before-talk failure, addressing scheduling request failure, performing a small data transfer, or positioning.

As shown by reference number 605, the network node 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 610, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier. The transmission of the RAM is referred to herein as initiating the random access procedure. In some aspects, the UE 120 may initiate the random access procedure in accordance with a trigger, such as a PDCCH order received from the network node 110 or a trigger determined by the UE 120 (e.g., a MAC layer of the UE).

As shown by reference number 615, the network node 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the network node 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the network node 110 may transmit the PDSCH communication for the RAR, as scheduled by the PDCCH communication. The RAR may be included in a MAC protocol data unit (PDU) of the PDSCH communication.

As shown by reference number 620, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 625, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 630, if the UE 120 successfully receives the RRC connection setup message, the UE 120 may transmit a hybrid automatic repeat request (HARQ) acknowledgment (ACK).

The random access procedure may terminate. In some aspects, the random access procedure may terminate upon reception of the RRC connection setup message. In some aspects, the random access procedure may terminate upon transmission of the HARQ ACK. In some aspects, the termination of the random access procedure may depend on a purpose of the random access procedure. For example, a random access procedure for requesting system information may terminate upon reception of the system information or a response to a request for the system information. As another example, a random access procedure for TA acquisition may terminate upon receiving a response carrying the TA. As another example, a random access procedure for scheduling request failure may terminate upon receiving a grant.

In some aspects, the UE 120 may perform a two-step random access procedure. In a two-step random access procedure, Msg1 and Msg3 are consolidated into a single transmission (referred to as MsgA) comprising a PRACH transmission and a PUSCH transmission. Msg2 and Msg4 are consolidated into a single transmission (referred to as MsgB).

As indicated above, FIG. 6 is provided as an example. Other examples may differ from what is described with regard to FIG. 6.

FIG. 7 is a diagram illustrating an example 700 of an intra-serving-cell RACH procedure and an example 705 of a cross-cell PDCCH-ordered RACH procedure, in accordance with the present disclosure. The intra-serving cell RACH procedure of example 700 is referred to hereinafter as a first RACH procedure. The cross-cell PDCCH-ordered RACH procedure of example 705 is referred to hereinafter as a second RACH procedure. As shown, both the first RACH procedure and the second RACH procedure may involve a serving cell of the UE (e.g., the serving cell 504 of FIG. 5). Furthermore, the second RACH procedure may involve a candidate cell (e.g., a candidate cell 506 of FIG. 5).

In example 700, the UE performs the first RACH procedure with the serving cell. For example, the UE may perform a two-step random access procedure or a four-step random access procedure with the serving cell, as described with regard to FIG. 6. The first RACH procedure may include at least one of transmission of a PRACH transmission or reception of an RAR, shown by reference number 710, from the serving cell. In some aspects, the UE may autonomously initiate the first RACH procedure (e.g., without receiving a trigger from the serving cell). In some other aspects, the UE may receive a trigger from the serving cell (e.g., a PDCCH order), and may initiate the first RACH procedure in accordance with the trigger.

In example 705, the UE may perform the second RACH procedure with the candidate cell. For example, the UE may receive a trigger from the serving cell, such as a PDCCH order indicating to perform the second RACH procedure with the candidate cell. For example, the PDCCH order may identify the candidate cell. The UE may transmit a PRACH transmission to the candidate cell, as shown by reference number 715. As shown by reference numbers 720 and 725, in some aspects, the UE may receive an RAR. For example, as shown by reference number 720, the UE may receive, from the candidate cell, an RAR indicating the TA for the candidate cell (shown as "TA-cell2"). As another example, as shown by reference number 725, the UE may receive, from the serving cell, an RAR indicating the TA for the candidate cell. In some aspects, the UE may not receive an RAR. For example, the UE may receive (e.g., from the serving cell) a MAC-CE indicating the TA.

The UE receiving a trigger for the second RACH procedure before the first RACH procedure has terminated may be referred to as a RACH collision.

As indicated above, FIG. 7 is provided as an example. Other examples may differ from what is described with regard to FIG. 7.

Figure 8:
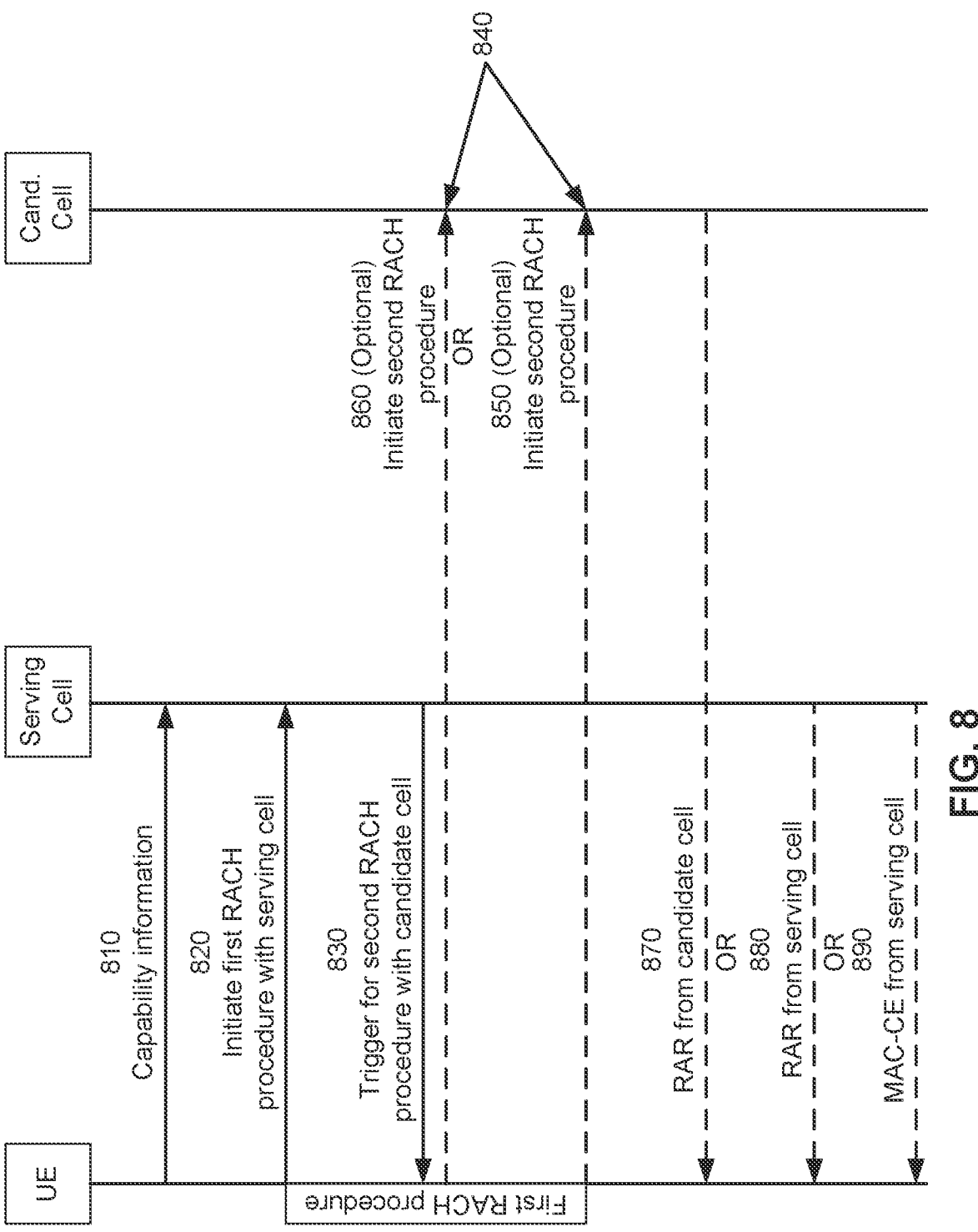
FIG. 8 is a diagram illustrating an example of signaling associated with random access channel collision during timing advance acquisition for LTM, in accordance with the present disclosure.

FIG. 8 is a diagram illustrating an example 800 of signaling associated with RACH collision during TA acquisition for LTM, in accordance with the present disclosure. As shown, example 800 includes a UE (e.g., UE 120), a serving cell (e.g., the serving cell 504 of FIG. 5, the serving cell of FIG. 7), and a candidate cell (e.g., a candidate cell 506 of FIG. 5, the candidate cell of FIG. 7). In some aspects, the serving cell and the candidate cell may be implemented by a same network node 110 (e.g., a same gNB). In some aspects, the serving cell may be implemented by a first network node 110 and the candidate cell may be implemented by a second network node 110.

As shown by reference number 810, in some aspects, the UE may transmit capability information. For example, the capability information may indicate a capability for multiple concurrent RACH procedures. For example, the capability may indicate whether the UE can concurrently perform a first RACH procedure (as described with regard to example 700) and a second RACH procedure (as described with regard to example 705). In some aspects, the capability may indicate whether the UE can receive an RAR carrying a TA from the serving cell, the candidate cell, or both. The serving cell and/or the candidate cell may perform one or more of the operations described with regard to reference numbers 820-890 in accordance with the capability.

As shown by reference number 820, the UE may initiate a first RACH procedure with the serving cell. For example, the UE may transmit a PRACH transmission to the serving cell in connection with a two-step random access procedure or a four-step random access procedure. The first RACH procedure may include, for example, the random access procedure described with regard to FIG. 6 or the first RACH procedure described with regard to example 700 of FIG. 7.

As shown by reference number 830, the serving cell may transmit, and the UE may receive, a trigger for a second RACH procedure with the candidate cell. For example, the UE may be configured (e.g., via RRC signaling or lower-layer signaling such as Layer 1 or Layer 2 signaling) with a set of candidate cells including the candidate cell. The second RACH procedure may be for acquiring a TA of the candidate cell, as described with regard to reference number 408 of FIG. 4 or example 705 of FIG. 7. The second RACH procedure may include, for example, the second RACH procedure described with regard to FIG. 7. As shown, the serving cell may transmit, and the UE may receive, the trigger prior to terminating the first RACH procedure. For example, the UE may receive the trigger while the first RACH procedure is ongoing. Thus, there may be a collision between the first RACH procedure and the second RACH procedure.

As shown by reference number 840, the UE may initiate the second RACH procedure with the candidate cell. In some aspects, as shown by reference number 850, the UE may initiate the second RACH procedure (e.g., by transmitting a PRACH transmission to the candidate cell) after the first RACH procedure has terminated. For example, the UE may defer transmission of the PRACH transmission to the candidate cell, based at least in part on the PDCCH order (e.g., the PRACH transmission may be in response to the PDCCH order) until after the first RACH procedure has terminated. Thus, complexity and resource usage at the UE are reduced.

In some aspects, as shown by reference number 860, the UE may transmit the PRACH transmission to the candidate cell before the first RACH procedure has terminated. For example, the UE may transmit a PRACH transmission to the candidate cell based at least in part on the PDCCH order, which may occur before the first RACH procedure has terminated.

In some aspects, as shown by reference number 870, the UE may receive an RAR from the candidate cell, as described with regard to reference number 720 of FIG. 7. For example, the RAR may include a TA of the candidate cell associated with the UE. In such examples, the RAR may indicate whether the RAR is associated with the first RACH procedure (e.g., the serving cell) or the second RACH procedure (e.g., the candidate cell). For example, the RAR may be indicated as being associated with the second RACH procedure by a receive beam used by the UE to receive the RAR. In this example, if the receive beam is associated with the candidate cell (e.g., is used to receive communications from the candidate cell), it may indicate that the RAR is associated with the second RACH procedure. In this example, if the receive beam is associated with the serving cell (e.g., is used to receive communications from the serving cell), it may indicate that the RAR is associated with the first RACH procedure. As another example, the RAR may be indicated as being associated with the second RACH procedure by a radio network temporary identifier (RNTI) to which the RAR is addressed. In this example, RARs received from the candidate cell may be addressed to a first RNTI of the UE, and RARs received from the serving cell may be addressed to a second RNTI of the UE. As yet another example, the RAR may be indicated as being associated with the second RACH procedure by a frequency on which the RAR is received. In this example, if the RAR is received on a frequency of the candidate cell (e.g., a carrier of the candidate cell, a configured frequency for RACH associated with the candidate cell, etc.), this may indicate that the RAR is associated with the second RACH procedure. In this example, if the RAR is received on a frequency of the serving cell (e.g., a carrier of the serving cell, a configured frequency for RACH associated with the serving cell, etc.), this may indicate that the RAR is associated with the first RACH procedure.

In some aspects, as shown by reference number 880, the UE may receive an RAR from the serving cell, as described with regard to reference number 725 of FIG. 7. For example, the RAR may include a TA of the candidate cell associated with the UE. In such examples, the RAR may indicate whether the RAR is associated with the first RACH procedure (e.g., the serving cell, as in the RAR of example 700) or the second RACH procedure (e.g., the candidate cell, as in the RAR shown by reference number 725 of FIG. 7). For example, the RAR may be indicated as being associated with the first RACH procedure by a random access preamble identifier (RAPID) of the RAR. In this example, RARs associated with the first RACH procedure may include a first RAPID in a MAC subheader of the RAR, and RARs associated with the second RACH procedure (e.g., the candidate cell) may include a second RAPID in the MAC subheader of the RAR. As another example, RARs for the first RACH procedure may not include a MAC RAR (e.g., a MAC-CE included in the RAR), but an RAR transmitted by the serving cell for the second RACH procedure may include an RAR indicating a TA. As yet another example, an RAR associated with the first RACH procedure may use a first format (e.g., a first format including a grant), whereas an RAR transmitted by the serving cell and associated with the second RACH procedure may use a second RACH format (e.g., which may omit a grant, or which may include a cell identifier of the candidate cell). In some aspects, the second format may be specific to LTM. As another example, an RAR transmitted by the serving cell and associated with the second RACH procedure may include information indicating an identifier of the candidate cell (e.g., a cell identifier of the candidate cell) or an identifier of the UE for the candidate cell (e.g., the UE's identifier in the candidate cell).

In some aspects, as shown by reference number 890, the UE may receive a MAC-CE from the serving cell. For example, the UE may not receive an RAR from the serving cell or the candidate cell. The MAC-CE may include the TA of the candidate cell. Thus, the UE may not need to differentiate the source of an RAR, and may not need to cancel or defer PRACH transmission as described with regard to reference number 850.

In some aspects, the UE may cancel (e.g., discard) a PDCCH order for the second RACH procedure received before termination of the first RACH procedure. For example, the UE may not perform the operations shown by reference numbers 840-890.

As indicated above, FIG. 8 is provided as an example. Other examples may differ from what is described with regard to FIG. 8.

Figure 9:
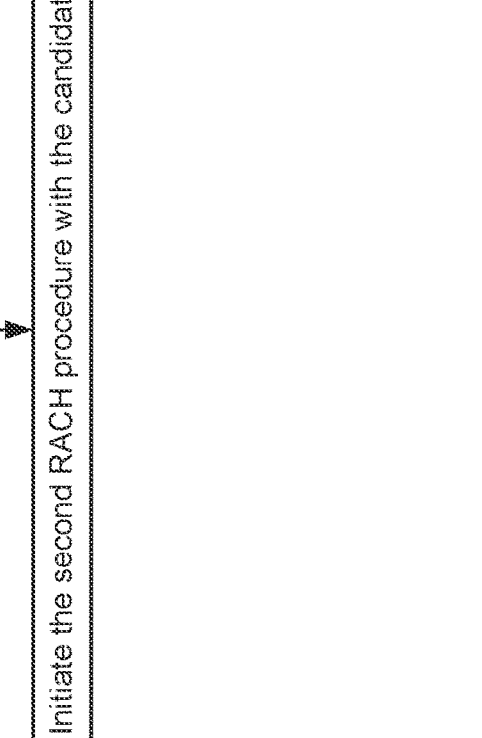
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with random access channel collision during timing adjustment acquisition for layer 1 or layer 2 triggered mobility.

As shown in FIG. 9, in some aspects, process 900 may include initiating a first random access channel (RACH) procedure with a serving cell of the UE (block 910). For example, the UE (e.g., using communication manager 140 and/or transmission component 1104, depicted in FIG. 11) may initiate a first RACH procedure with a serving cell of the UE, as described above, for example, with reference to FIGS. 4 and 6-8.

As further shown in FIG. 9, in some aspects, process 900 may include receiving, prior to terminating the first RACH procedure, a trigger for a second RACH procedure with a candidate cell of the UE (block 920). For example, the UE (e.g., using communication manager 140 and/or reception component 1102, depicted in FIG. 11) may receive, prior to terminating the first RACH procedure, a trigger for a second RACH procedure with a candidate cell of the UE, as described above, for example, with reference to FIGS. 6-8.

As further shown in FIG. 9, in some aspects, process 900 may include initiating the second RACH procedure with the candidate cell (block 930). For example, the UE (e.g., using communication manager 140 and/or transmission component 1104, depicted in FIG. 11) may initiate the second RACH procedure with the candidate cell, as described above, for example, with reference to FIGS. 7 and 8.

Process 900 may include additional aspects, such as any single aspect or any combination of aspects described below and/or in connection with one or more other processes described elsewhere herein.

In a first aspect, initiating the second RACH procedure further comprises initiating the second RACH procedure in accordance with a capability, of the UE, indicating whether the UE supports multiple concurrent RACH procedures.

In a second aspect, alone or in combination with the first aspect, initiating the second RACH procedure further comprises transmitting a physical RACH transmission to the candidate cell after the first RACH procedure has terminated.

In a third aspect, alone or in combination with one or more of the first and second aspects, process 900 includes deferring transmission of the physical RACH transmission until after the first RACH procedure has terminated.

In a fourth aspect, alone or in combination with one or more of the first through third aspects, initiating the second RACH procedure further comprises transmitting a physical RACH transmission to the candidate cell before the first RACH procedure has terminated.

In a fifth aspect, alone or in combination with one or more of the first through fourth aspects, process 900 includes receiving a RAR from the candidate cell, wherein the RAR is indicated as being associated with the second RACH procedure by at least one of a receive beam of the RAR, a radio network temporary identifier to which the RAR is addressed, or a frequency on which the RAR is received.

In a sixth aspect, alone or in combination with one or more of the first through fifth aspects, process 900 includes receiving a RAR from the serving cell, wherein the RAR is indicated as being associated with one of the first RACH procedure or the second RACH procedure by at least one of a random access preamble identifier of the RAR, a medium access control RAR included in the RAR, a format of the RAR, an identifier of the candidate cell included in the RAR, or an identifier of the UE, for the candidate cell, included in the RAR.

In a seventh aspect, alone or in combination with one or more of the first through sixth aspects, process 900 includes receiving medium access control signaling, from the serving cell, including an indication of the candidate cell and a timing adjustment for the candidate cell.

In an eighth aspect, alone or in combination with one or more of the first through seventh aspects, the second RACH procedure is associated with a Layer 1 or Layer 2 mobility procedure to the candidate cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
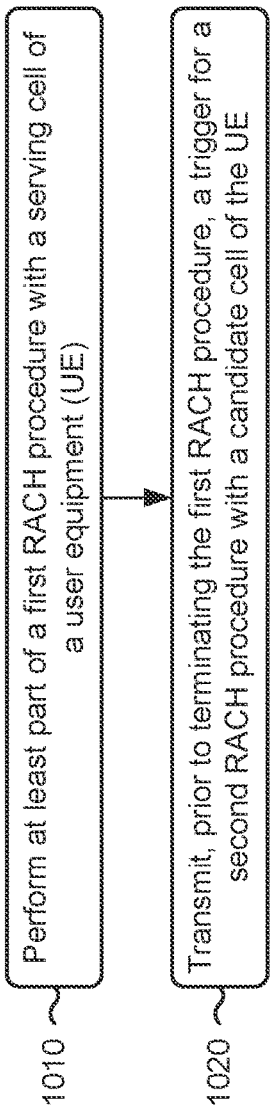
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with random access channel collision during timing adjustment acquisition for layer 1 or layer 2 triggered mobility.

As shown in FIG. 10, in some aspects, process 1000 may include performing at least part of a first RACH procedure with a serving cell of a UE (block 1010). For example, the network node (e.g., using communication manager 150 and/or reception component 1202, depicted in FIG. 12) may perform at least part of a first RACH procedure with a serving cell of a UE, as described above, for example, with reference to FIGS. 4 and 6-8.

As further shown in FIG. 10, in some aspects, process 1000 may include transmitting, prior to terminating the first RACH procedure, a trigger for a second RACH procedure with a candidate cell of the UE (block 1020). For example, the network node (e.g., using communication manager 150 and/or transmission component 1204, depicted in FIG. 12) may transmit, prior to terminating the first RACH procedure, a trigger for a second RACH procedure with a candidate cell of the UE, as described above, for example, with reference to FIGS. 7-8.

Process 1000 may include additional aspects, such as any single aspect or any combination of aspects described below and/or in connection with one or more other processes described elsewhere herein.

In a first aspect, process 1000 includes transmitting an RAR, associated with the second RACH procedure, to the UE, wherein the RAR is indicated as being associated with the second RACH procedure by at least one of a random access preamble identifier of the RAR, a medium access control RAR included in the RAR, a format of the RAR, an identifier of the candidate cell included in the RAR, or an identifier of the UE, for the candidate cell, included in the RAR.

In a second aspect, alone or in combination with the first aspect, process 1000 includes transmitting medium access control signaling including an indication of the candidate cell and a timing adjustment for the candidate cell.

In a third aspect, alone or in combination with one or more of the first and second aspects, the second RACH procedure is associated with a Layer 1 or Layer 2 mobility procedure or handover to the candidate cell.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
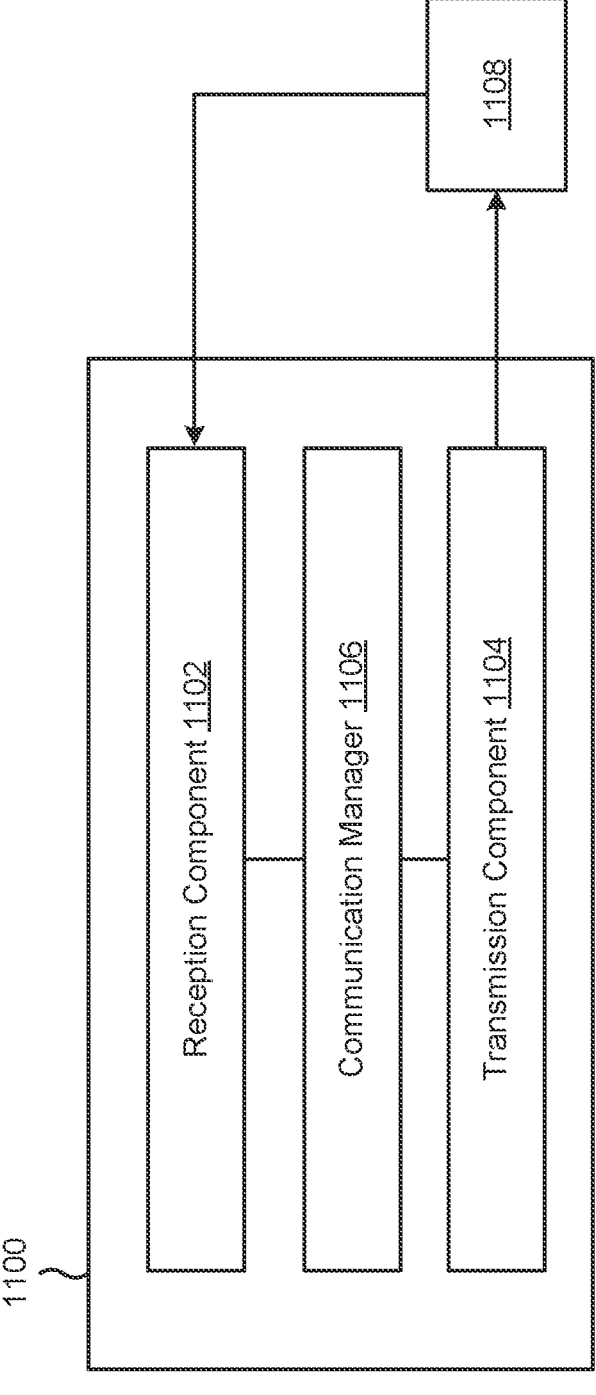
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may initiate a first RACH procedure with a serving cell of the UE. The reception component 1102 may receive, prior to terminating the first RACH procedure, a trigger for a second RACH procedure with a candidate cell of the UE. The communication manager 1106 may initiate the second RACH procedure with the candidate cell.

The communication manager 1106 may defer transmission of the physical RACH transmission until after the first RACH procedure has terminated.

The reception component 1102 may receive an RAR from the candidate cell, wherein the RAR is indicated as being associated with the second RACH procedure by at least one of a receive beam of the RAR, a radio network temporary identifier to which the RAR is addressed, or a frequency on which the RAR is received.

The reception component 1102 may receive an RAR from the serving cell, wherein the RAR is indicated as being associated with one of the first RACH procedure or the second RACH procedure by at least one of a random access preamble identifier of the RAR, a medium access control RAR included in the RAR, a format of the RAR, an identifier of the candidate cell included in the RAR, or an identifier of the UE, for the candidate cell, included in the RAR.

The reception component 1102 may receive medium access control signaling, from the serving cell, including an indication of the candidate cell and a timing adjustment for the candidate cell.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
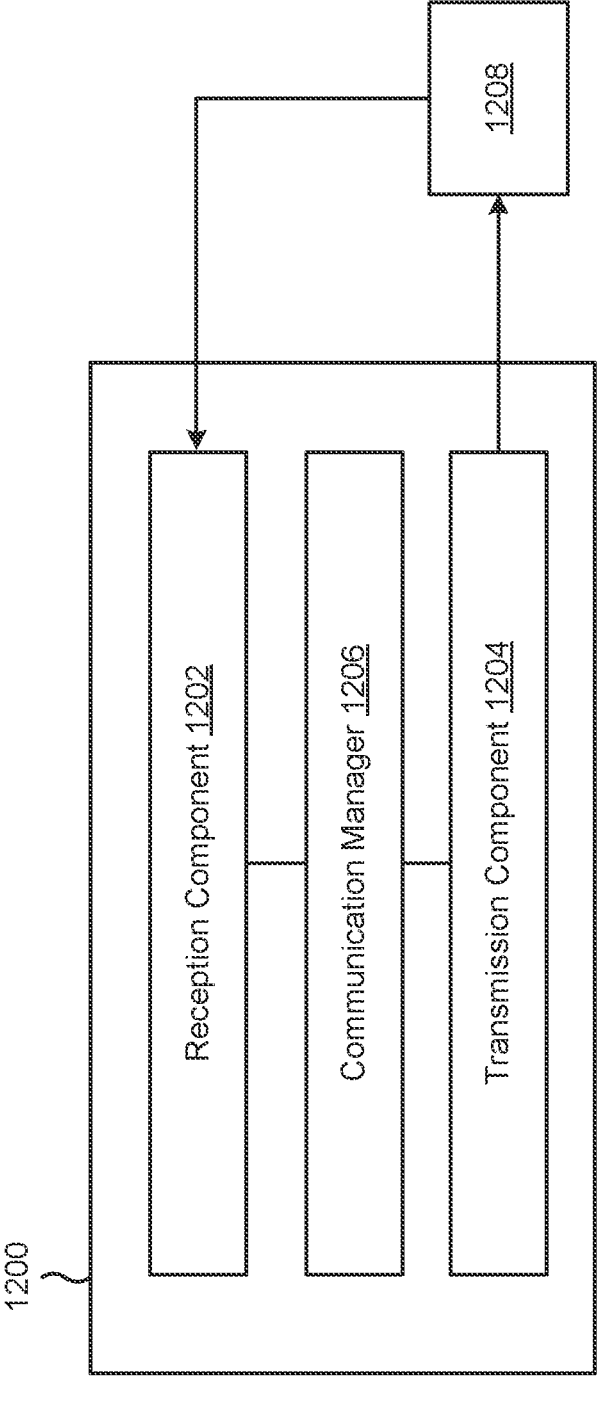
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The communication manager 1206 may perform at least part of a first RACH procedure with a serving cell of a UE. The transmission component 1204 may transmit, prior to terminating the first RACH procedure, a trigger for a second RACH procedure with a candidate cell of the UE.

The transmission component 1204 may transmit an RAR, associated with the second RACH procedure, to the UE, wherein the RAR is indicated as being associated with the second RACH procedure by at least one of a random access preamble identifier of the RAR, a medium access control RAR included in the RAR, a format of the RAR, an identifier of the candidate cell included in the RAR, or an identifier of the UE, for the candidate cell, included in the RAR.

The transmission component 1204 may transmit medium access control signaling including an indication of the candidate cell and a timing adjustment for the candidate cell.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: initiating a first random access channel (RACH) procedure with a serving cell of the UE; receiving, prior to terminating the first RACH procedure, a trigger for a second RACH procedure with a candidate cell of the UE; and initiating the second RACH procedure with the candidate cell.

Aspect 2: The method of Aspect 1, wherein initiating the second RACH procedure further comprising initiating the second RACH procedure in accordance with a capability, of the UE, indicating whether the UE supports multiple concurrent RACH procedures.

Aspect 3: The method of any of Aspects 1-2, wherein initiating the second RACH procedure further comprises transmitting a physical RACH transmission to the candidate cell after the first RACH procedure has terminated.

Aspect 4: The method of Aspect 3, further comprising deferring transmission of the physical RACH transmission until after the first RACH procedure has terminated.

Aspect 5: The method of any of Aspects 1-4, wherein initiating the second RACH procedure further comprises transmitting a physical RACH transmission to the candidate cell before the first RACH procedure has terminated.

Aspect 6: The method of Aspect 5, further comprising receiving a random access response (RAR) from the candidate cell, wherein the RAR is indicated as being associated with the second RACH procedure by at least one of: a receive beam of the RAR, a radio network temporary identifier to which the RAR is addressed, or a frequency on which the RAR is received.

Aspect 7: The method of Aspect 5, further comprising receiving a random access response (RAR) from the serving cell, wherein the RAR is indicated as being associated with one of the first RACH procedure or the second RACH procedure by at least one of: a random access preamble identifier of the RAR, a medium access control RAR included in the RAR, a format of the RAR, an identifier of the candidate cell included in the RAR, or an identifier of the UE, for the candidate cell, included in the RAR.

Aspect 8: The method of any of Aspects 1-7, further comprising receiving medium access control signaling, from the serving cell, including an indication of the candidate cell and a timing adjustment for the candidate cell.

Aspect 9: The method of any of Aspects 1-8, wherein the second RACH procedure is associated with a Layer 1 or Layer 2 mobility handover to the candidate cell.

Aspect 10: A method of wireless communication performed by a network node, comprising: performing at least part of a first random access channel (RACH) procedure with a serving cell of a user equipment (UE); and transmitting, prior to terminating the first RACH procedure, a trigger for a second RACH procedure with a candidate cell of the UE.

Aspect 11: The method of Aspect 10, further comprising transmitting a random access response (RAR), associated with the second RACH procedure, to the UE, wherein the RAR is indicated as being associated with the second RACH procedure by at least one of: a random access preamble identifier of the RAR, a medium access control RAR included in the RAR, a format of the RAR, an identifier of the candidate cell included in the RAR, or an identifier of the UE, for the candidate cell, included in the RAR.

Aspect 12: The method of any of Aspects 10-11, further comprising
transmitting medium access control signaling including an indication of the candidate cell and a timing adjustment for the candidate cell.

Aspect 13: The method of any of Aspects 10-12, wherein the second RACH procedure is associated with a Layer 1 or Layer 2 mobility handover to the candidate cell.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
    initiate a first random access channel (RACH) procedure with a serving cell of the UE;
    receive, prior to terminating the first RACH procedure, a trigger for a second RACH procedure with a candidate cell of the UE; and
    initiate the second RACH procedure with the candidate cell, wherein the one or more processors, to initiate the second RACH procedure, are configured to transmit a physical RACH transmission to the candidate cell after the first RACH procedure has terminated.

2. The UE of claim 1, wherein the one or more processors, to initiate the second RACH procedure, are configured to initiate the second RACH procedure in accordance with a capability, of the UE, indicating whether the UE supports multiple concurrent RACH procedures.

3. The UE of claim 1, wherein the one or more processors are further configured to defer transmission of the physical RACH transmission until after the first RACH procedure has terminated.

4. The UE of claim 1, wherein the one or more processors are further configured to receive a random access response (RAR) from the candidate cell, wherein the RAR is indicated as being associated with the second RACH procedure by at least one of:
    a receive beam of the RAR,
    a radio network temporary identifier to which the RAR is addressed, or
    a frequency on which the RAR is received.

5. The UE of claim 1, wherein the one or more processors are further configured to receive a random access response (RAR) from the serving cell, wherein the RAR is indicated as being associated with one of the first RACH procedure or the second RACH procedure by at least one of:
    a random access preamble identifier of the RAR,
    a medium access control RAR included in the RAR,
    a format of the RAR,
    an identifier of the candidate cell included in the RAR, or an identifier of the UE, for the candidate cell, included in the RAR.

6. The UE of claim 1, wherein the one or more processors are further configured to receive medium access control signaling, from the serving cell, including an indication of the candidate cell and a timing adjustment for the candidate cell.

7. The UE of claim 1, wherein the second RACH procedure is associated with a Layer 1 or Layer 2 triggered mobility handover to the candidate cell.

8. A network node for wireless communication, comprising:
a memory; and
one or more processors, coupled to the memory, configured to:
    perform at least part of a first random access channel (RACH) procedure with a serving cell of a user equipment (UE);
    transmit, prior to terminating the first RACH procedure, a trigger for a second RACH procedure with a candidate cell of the UE; and
    receive, from the UE after the first RACH procedure has terminated, a physical RACH transmission to initiate the second RACH procedure.

9. The network node of claim 8, wherein the one or more processors are further configured to transmit a random access response (RAR), associated with the second RACH procedure, to the UE, wherein the RAR is indicated as being associated with the second RACH procedure by at least one of:
    a random access preamble identifier of the RAR,
    a medium access control RAR included in the RAR,
    a format of the RAR,
    an identifier of the candidate cell included in the RAR, or
    an identifier of the UE, for the candidate cell, included in the RAR.

10. The network node of claim 8, wherein the one or more processors are further configured to transmit medium access control signaling including an indication of the candidate cell and a timing adjustment for the candidate cell.

11. The network node of claim 8, wherein the second RACH procedure is associated with a Layer 1 or Layer 2 triggered mobility handover to the candidate cell.

12. The network node of claim 8, wherein the one or more processors are further configured to receive, from the UE, capability information indicating whether the UE supports multiple concurrent RACH procedures.

13. The network node of claim 12, wherein the capability may indicate whether the UE can receive a random access response (RAR) carrying a timing advance (TA) from the serving cell, the candidate cell, or both.

14. A method of wireless communication performed by a user equipment (UE), comprising:
    initiating a first random access channel (RACH) procedure with a serving cell of the UE;
    receiving, prior to terminating the first RACH procedure, a trigger for a second RACH procedure with a candidate cell of the UE; and
    initiating the second RACH procedure with the candidate cell, further comprising transmitting a physical RACH transmission to the candidate cell after the first RACH procedure has terminated.

15. The method of claim 14, wherein initiating the second RACH procedure further comprising initiating the second RACH procedure in accordance with a capability, of the UE, indicating whether the UE supports multiple concurrent RACH procedures.

16. The method of claim 14, further comprising deferring transmission of the physical RACH transmission until after the first RACH procedure has terminated.

17. The method of claim 14, further comprising receiving a random access response (RAR) from the candidate cell, wherein the RAR is indicated as being associated with the second RACH procedure by at least one of:

a receive beam of the RAR, a radio network temporary identifier to which the RAR is addressed, or a frequency on which the RAR is received.

18. The method of claim 14, further comprising receiving a random access response (RAR) from the serving cell, wherein the RAR is indicated as being associated with one of the first RACH procedure or the second RACH procedure by at least one of:

a random access preamble identifier of the RAR, a medium access control RAR included in the RAR, a format of the RAR, an identifier of the candidate cell included in the RAR, or an identifier of the UE, for the candidate cell, included in the RAR.

19. The method of claim 14, further comprising receiving medium access control signaling, from the serving cell, including an indication of the candidate cell and a timing adjustment for the candidate cell.

20. The method of claim 14, wherein the second RACH procedure is associated with a Layer 1 or Layer 2 mobility handover to the candidate cell.

21. A method of wireless communication performed by a network node, comprising:

performing at least part of a first random access channel (RACH) procedure with a serving cell of a user equipment (UE);

transmitting, prior to terminating the first RACH procedure, a trigger for a second RACH procedure with a candidate cell of the UE; and receiving, from the UE after the first RACH procedure has terminated, a physical RACH transmission to initiate the second RACH procedure.

22. The method of claim 21, further comprising transmitting a random access response (RAR), associated with the second RACH procedure, to the UE, wherein the RAR is indicated as being associated with the second RACH procedure by at least one of:

a random access preamble identifier of the RAR, a medium access control RAR included in the RAR, a format of the RAR, an identifier of the candidate cell included in the RAR, or an identifier of the UE, for the candidate cell, included in the RAR.

23. The method of claim 21, further comprising transmitting medium access control signaling including an indication of the candidate cell and a timing adjustment for the candidate cell.

24. The method of claim 21, wherein the second RACH procedure is associated with a Layer 1 or Layer 2 triggered mobility handover to the candidate cell.

25. The method of claim 21, further comprising:

receiving, from the UE, capability information indicating whether the UE supports multiple concurrent RACH procedures.

26. The method of claim 25, wherein the capability may indicate whether the UE can receive a random access response (RAR) carrying a timing advance (TA) from the serving cell, the candidate cell, or both.

* * * * *